UNITED STATES PATENT OFFICE.

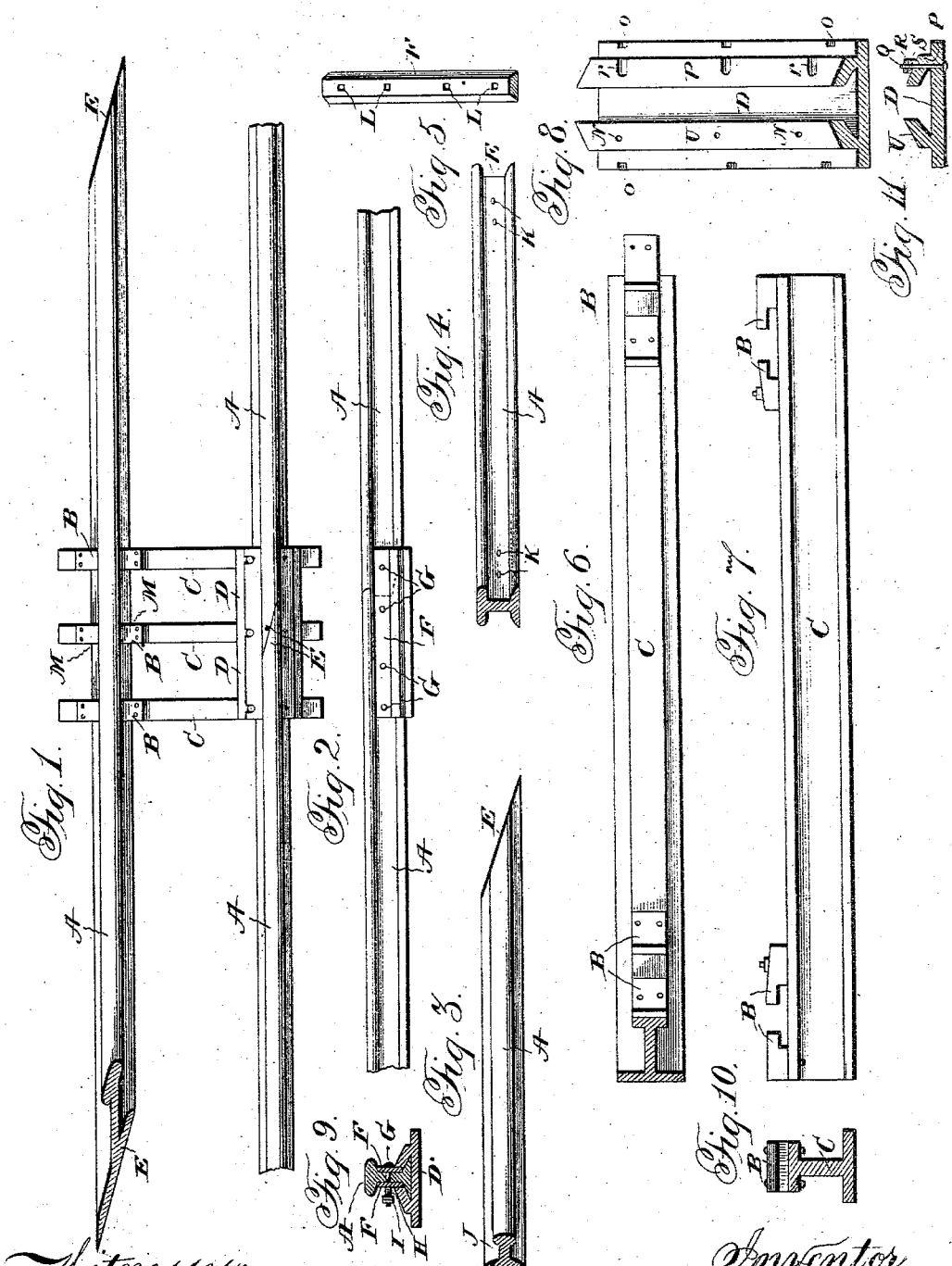

ELMER G. BAKER, OF PLEASANTVILLE, PENNSYLVANIA.

DEVICE FOR JOINING RAILROAD-RAILS.

SPECIFICATION forming part of Letters Patent No. 715,339, dated December 9, 1902.

Application filed April 16, 1902. Serial No. 103,230. (No model.)

*To all whom it may concern:*

Be it known that I, ELMER G. BAKER, a citizen of the United States, residing at Pleasantville, in the county of Venango and State of Pennsylvania, have invented new and useful Devices for Joining Railroad-Rails, of which the following is a specification.

My invention relates to improvements in devices for joining railroad-rails for use in the tracks or roadways of railroads in which the ends of rails in a railroad-track are securely joined and fastened together by means of an expansion miter-joint resting in a shoe and bolts passing through beveled fish-plates and springs on the bolts which make the rail a continuous one without any material opening in the joint and without any low joint; and the objects of my improvement are, first, to decrease the wear and tear on rolling-stock passing over the rails; second, to permit with safety increase of speed of railroad-trains and rolling-stock passing over the rails; third, to prevent the spreading or displacement of rails in a railroad-track by the use of iron or steel ties; fourth, to increase safety in operating railroads; fifth, to decrease the cost of operating railroads; sixth, to decrease the liability to accidents on railroads caused by imperfect joints, spreading of rails, and the like;
seventh, to increase the durability of the railroad-track; eighth, to enable the use of solid rails having any length desired up to seventy-five feet. I attain these objects by the mechanism illustrated in the accompanying drawings, in which—

Figure I is a section of a railroad-track with detailed view in perspective of joint with shoe and ties to which shoe is fastened and fasteners for securing track to ties; Fig. II, a side view of railroad rail and joint as held in place and fastened with fish-plate shoe and bolts; Fig. III, a horizontal section top view of a railroad-rail with square end and mitered end; Fig. IV, a horizontal section side view of a railroad-rail with square end and mitered end; Fig. V, a fish-plate, beveled on inside to fit rail, with square holes for square-shouldered bolts with oval heads; Fig. VI, a steel or iron railroad-tie, top view, with fasteners for fastening rails to tie; Fig. VII, a side view of same as Fig. VI; Fig. VIII, an iron or steel shoe for holding rails at the mitered joint; Fig. IX, a cross-section of railroad-rail, showing bolt, spring, nuts, fish-plate, and shoe in and on rail; Fig. X, a cross-section of iron or steel railroad-tie with fasteners on top of tie for fastening rail to tie, held to place by bolts; Fig. XI, a cross-section of iron or steel shoe, showing manner of fastening adjustable flange to plate.

Similar letters refer to similar parts throughout the several views.

The bar or rail A, with its mitered ends E, fastened upon its under side to iron or steel bars or ties C by means of fasteners B, bolted to ties C, (see Fig. I,) constitutes a whole rail in position. The joined bars or rails A, (see Fig. I,) with their mitered ends E, held together by fish-plates F, (see Fig. II,) fastened to tie C by shoe D and bolts Q and flanges P and U, (see Figs. VIII and XI,) constitute a continuous rail, such as my invention produces, without any material opening where the bars or rails are joined or come together. I make the mitered end of rail E at top of rail about two feet from the point to heel of miter. The shoe, Fig. VIII, is constructed of either iron or steel, cast or wrought, and is about three feet in length, so as to extend over three ties. There are two flanges P and U to this shoe, one of which is cast solid with the plate D of the shoe or riveted thereto, the other flange designed for the inside of the rail and provided with slot-holes and washer adapted to flange, and bolt is adjustable to conform to the width of bottom of rail A and is bolted to plate D, so as to hold firmly in place said rail. Flanges P and U are beveled on the upper side and grooved on the inner or under side, so as to fit over the bottom flange of the rail A. The flanges P and U should be high enough to hold fish-plate F at miter-joint E of said rail. (See Fig. II.) The shoe, Fig. VIII, is bolted to ties C C C, Fig. I, through the holes N and T when used on steel or iron ties. In case it is desired to use wooden ties, as may be done, the said adjustable flange P is bolted to the said shoe-plate D, and the said shoe-plate is spiked to said ties at notches O instead of being bolted thereto. The said shoe, in connection with said fish-plate F, bolts G, spring H, nuts I, and tie C, as shown in the various figures in said drawings, makes a tight joint under all conditions. Fig. XI shows the method of connecting the adjustable flange P to the shoe-plate D. Letter Q shows the bolt in position, letter R the nut, letter S the wedge-shaped washer, made to conform to the bevel of the flange P, and letter D shows the shoe-plate.

At about the middle of rail A, at letter M in Fig. I, I make two holes in the bottom flanges of the said rail, one hole on each side, and bolt rail, in case of iron or steel tie, to tie C and spike rail to tie in case of wooden tie. This divides and equalizes the expansion and contraction of said rail and prevents the entire result of the expansion and contraction of said rail from being manifested or brought out at one end of the rail. This is especially beneficial in the case of a rail exceeding thirty feet in length. The bolt-holes K K in and near the mitered end E of rail, as shown in Fig. IV, are oblong, and their length is in proportion to the length of the rail according to the present usage. I prefer the steel or iron ties of the shape and form heretofore used in bridgework and known as the "girder T-rail," and of suitable size, as illustrated in Figs. VI and VII. In case steel or iron ties are used in the construction of the railroad-track I prefer that the fastenings at the said point M, Fig. I, be bolts and that the fasteners B be omitted at that point.

Coil-springs H, Fig. IX, on bolts G, Fig. II, are made from steel, not less than two coils, and are placed between the nuts I and fish-plate F and press miter-joints E, Fig. I, together. These springs prevent the expansion and contraction of the rails from opening or separating the miter-joint E. One of the nuts I holds the spring in place and the other nut, being the outer one, being a jam-nut.

Where a square joint is desired to form a connection with a frog or for other purposes, a section of rail, as shown in Fig. III, is used. In this figure rail A has a mitered end and a square end. The square end should be securely fastened to the frog or other connections. This will bring the result of the expansion and contraction of the rail A at the miter-joint and not affect the joint at the square end or joint.

Fasteners B (see Figs. VI and VII) are made from either iron or steel, cast or wrought, and are fastened, by means of bolts, to the upper surface of steel or iron tie, one fastener on the inside of rail and the other on the outside of the rail, as shown on said figures. The inside fastener is adjustable. The outside one may be cast with the tie or riveted to it at the making of the tie. The under side of the fastener is beveled to fit the bottom flange of the rail and projects over the bottom flange of the rail about one and one-half inches.

My said invention or improvement may be used on steam, electric, or traction railroads and railways and all other roads using iron or steel rails in their track or road way.

What I claim as my invention, and desire to secure by Letters Patent, is—

In a device of the class described, the combination of the rails having mitered or beveled ends, beveled fish-plates, bolts passing through the fish-plates, coiled springs arranged on the bolts and yieldingly engaging the fish-plates, a shoe receiving the rails and provided with an adjustable flange and a rigid flange, vertical fastening devices securing the adjustable flange to the shoe, wedge-shaped washers arranged on the vertical fastening devices and engaging the adjustable flange of the shoe, substantially as described.

In testimony whereof I have signed my name to this specification in the presence of two subscribing witnesses.

ELMER G. BAKER.

Witnesses:
 MARK J. HEYWANG,
 JAMES E. MURRAY.